United States Patent [19]

Rietsch

[11] Patent Number: 4,777,628

[45] Date of Patent: Oct. 11, 1988

[54] SEISMIC SYSTEM AND METHOD

[75] Inventor: Eike F. Rietsch, Houston, Tex.

[73] Assignee: Texaco Inc., White Plains, N.Y.

[21] Appl. No.: 851,614

[22] Filed: Apr. 14, 1986

[51] Int. Cl.[4] .......................... G04B 17/00; G01V 1/28

[52] U.S. Cl. .......................................... 367/13; 367/43; 364/421

[58] Field of Search ........................ 367/13, 43, 66, 77; 364/421, 575, 579, 734; 340/514, 515; 375/10; 73/1 DV; 371/25, 36, 57, 68, 69

[56] References Cited

U.S. PATENT DOCUMENTS

| | | | |
|---|---|---|---|
| 3,696,369 | 10/1972 | Laymon et al. | 367/136 |
| 3,858,170 | 12/1974 | Freeman et al. | 367/13 |
| 3,958,213 | 5/1976 | Scott et al. | 367/67 X |
| 4,233,677 | 11/1980 | Brown et al. | 367/13 |
| 4,246,652 | 1/1981 | Khan et al. | 364/421 X |
| 4,314,347 | 2/1982 | Stokely | 367/47 X |
| 4,344,158 | 8/1982 | Landrum, Jr. et al. | 364/421 X |
| 4,493,063 | 1/1985 | Tims et al. | 73/1 DV |
| 4,534,019 | 8/1985 | Wiggins et al. | 367/75 |

*Primary Examiner*—Thomas H. Tarcza
*Assistant Examiner*—Tod R. Swann
*Attorney, Agent, or Firm*—Robert A. Kulason; James J. O'Loughlin; Ronald G. Gillespie

[57] ABSTRACT

The apparatus of the present invention includes a group of at least three seismic detectors. Each seismic detector detects vibrations and provides a seismic signal in accordance with the sensed vibration. A multiplexer multiplexes the seismic signals to provide a multiplexed signal. The multiplexed signal is amplified and converted to digital signals. A memory stores the digital signals according to the detector of origin so that the stored digital signals for a detector are in effect a sample of the seismic signals from the detector. A microprocessor connected to the memory means derives a statistical reference from the stored samples. Samples that are outlying with respect to the statistical reference are discarded. The remaining samples are then combined in a predetermined manner to provide an enhanced seismic signal from the group of detectors.

20 Claims, 1 Drawing Sheet

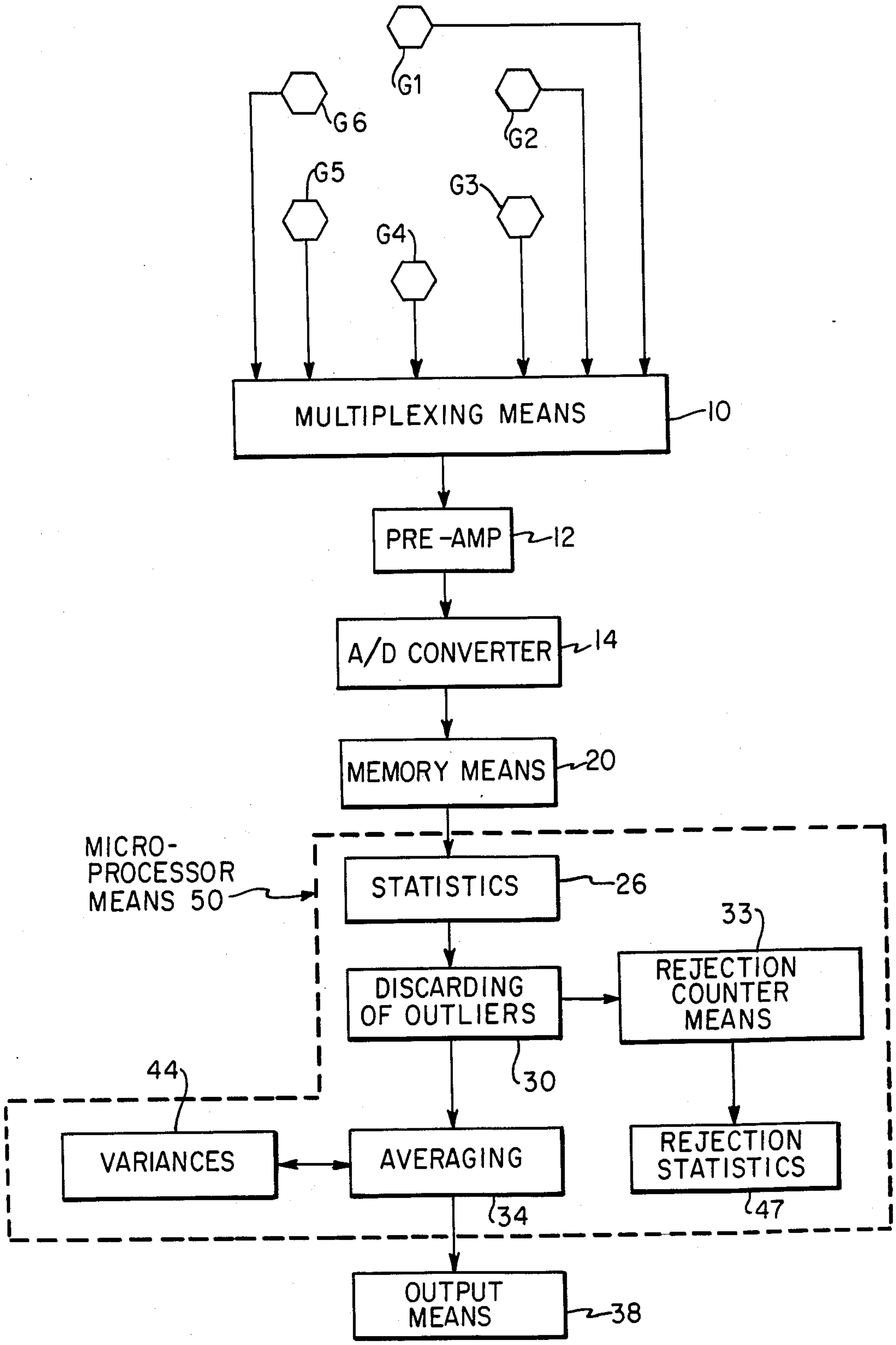
G1
G2
G3
G4
G5
G6
MULTIPLEXING MEANS
10
PRE-AMP
12
A/D CONVERTER
14
MEMORY MEANS
20
MICRO-PROCESSOR MEANS 50
STATISTICS
26
33
REJECTION COUNTER MEANS
DISCARDING OF OUTLIERS
30
44
VARIANCES
AVERAGING
34
REJECTION STATISTICS
47
OUTPUT MEANS
38

SEISMIC SYSTEM AND METHOD

BACKGROUND OF THE INVENTION

Field of the Invention

The present invention relates to seismic systems and methods.

SUMMARY OF THE INVENTION

The apparatus of the present invention includes a group of at least three seismic detectors. Each seismic detector detects vibrations and provides a seismic signal in accordance with the sensed vibration. A multiplexer multiplexes the seismic signals to provide a multiplexed signal. The multiplexed signal is amplified and converted to digital signals. A memory stores the digital signals according to the detector of origin so that the stored digital signals for a detector are in effect a sample of the seismic signals from the detector. A microprocessor connected to the memory means derives a statistical reference from the stored samples. Samples that are outlying with respect to the statistical reference are discarded. The remaining samples are then combined in a predetermined manner to provide an enhanced seismic signal for the group of detectors.

The objects and advantages of the invention will be described more fully hereinafter after a consideration of the detailed description which follows, taken together with the accompanying drawing wherein one embodiment of the invention is illustrated by way of an example. It is to be expressly understood, however, that the drawing is for illustration purposes only and is not to be construed as defining the limits of the invention.

DESCRIPTION OF THE DRAWING

The drawing is a simplified block diagram of a seismic system constructed in accordance with the present invention.

DESCRIPTION OF THE INVENTION

Presently seismic signals are picked up by groups of detectors, such as geophones on land and hydrophones in the water. The detectors are deployed along a profile or in an areal configuration. In land operations, each group of geophones consists of generally twelve to thirty-six individual geophones which are electrically connected to produce one output signal representative of the combined surface motion felt by all detectors in the group.

In order to discriminate against horizontally traveling waves, geophones of one group may be spread out over distances of up to several hundred feet. It is well known that such long geophone groups reduce not only the horizontally traveling noise but also high frequency components in the desired reflections from the subsurface interfaces. Furthermore, near surface irregularities of the velocity lead to an additional degradation of the combined output of the group of geophones which is not easily predictable.

The development of kilo-channel seismic systems makes it possible to do away with long geophone groups. Data can be collected with geophones bunched together, and patterns can be simulated, if deemed necessary, in the computer by combining the outputs of two or more groups of bunched geophones.

High resolution surveys conducted in this way call for high quality recordings of the surface motion of the earth. The output of geophones, however, can be degraded by mechanical or electrical defects and/or by poor planting of the geophones.

The present invention overcomes this problem by using several geophones and continuously monitoring their outputs. The geophones must be planted close enough to each other so they would provide essentially identical output signals if they were identical. Small deviations within the tolerance of the specifications and the geophones as well as differences in the way they were planted would lead to generally only slightly different output signals. A damaged geophone, a geophone in poor contact with the ground or one with characteristics different from the others will generate an output which may deviate significantly from that of the other geophones.

The present invention detects such deviations, determines a measure of quality of the combined output of the geophones and flags geophones for inspection if they are consistently out of line.

With reference to the Figure there are shown six geophones G1 through G6 providing their signals to multiplexing means 10. Although six geophones are shown even as few as three geophones may be used. The signal provided by multiplexing means 10 is provided to a pre-amp 12 which in turn provides an amplified signal to an analog-to-digital converter 14. A recording cycle begins when the first geophone G1 is connected, through the multiplexing means 10, with the A/D converter 14 and ends after the last geophone G6 has been connected. During one recording cycle, the multiplexing means 10 polls each of geophones G1 through G6 once, and the digital numbers (samples) provided by analog-to-digital converter 24, representative of the output of each geophone, are stored in a memory means 20. The six samples are then subjected to a statistical analysis as indicated in box 26. In this analysis, which will be described hereinafter, outliers are identified and discarded as represented by block 30. The discarding of outliers in block 20 leads to a block represented by rejection counter means 33 which includes a counter for each geophone of geophones G1 through G6. At the beginning of recordings the counters in rejection counter means 33 are set to zero. After each recording cycle the counter of those geophones whose output has been discarded is incremented by one.

The remaining samples are provided by block 30 to averaging means 34, the given average representing the average ground motion at the geophones G1 through G6 locations. This average is stored on tape or some other storage device or transmitted to the central recording station. This particular step is represented by block 38 entitled "output".

In order to provide a measure of the agreement between the accepted samples, which can be considered as a measure of the quality of the average, the variance or any other measure of the spread between the samples is computed as provided for by block 24.

If all the geophones G1 through G6 are within the same specifications and are planted with equal care, the numbers in the rejection counters will be about the same for all geophones G1 through G6. On the other hand, if one geophone consistently generates significantly different output than the others in the same group, the count in its rejection counter will be substantially higher than the counts in the other rejection counters. This indicates a need for inspection of that particular geophone. The contents of the rejection counters in rejection counter means 33, are analyzed as provided for by rejection statistics block 47. Well established statistical means can be used to tell whether statistically significant deviations exist between the rejection rates of the six geophones.

To allow quality control during field operations, means can be provided to transmit the contents of the rejection counter means 33 and/or the result of the accumulated statistics 47 to a central recording station.

The statistical analysis as provided by statistics block 26 can be carried out in many different ways as described, for example in P. J. Huber, Robust Statistical Procedures, CBMS-NSF Regional Conference Series in Applied Mathematics, 27, SIAM 1977; or V. Barnett, or T. Lewis, Outliers in Statistical Data, John Wiley & Sons, 1978.

One frequently used approach is to simply discard a certain percentage of the largest and smallest samples. For example, with twelve geophones in a group, one might eliminate the largest three and the smallest three samples in each recording cycle and thus retain only outputs from six geophones. The mean of those remaining six samples is then determined as provided for by block 34. The variance deviation is determined as provided for in variance block 44 and is the mean of the squared differences between the retained six samples and their mean as determined in averaging block 34.

As can be seen in the Figure, statistics 26, discarding of outliers 30, the averaging 34, the variances 44, rejection counter means 33 and the rejection statistics 47 may all be accomplished using conventional type microprocessor means 50.

Obviously there are very few restrictions on the number N of geophones connected to the apparatus. To make a statistical analysis as provided for in block 26 meaningful there must be at least three geophones in one group (N greater than or equal to 3). An upper limit for N is given by the maximum multiplex delay acceptable for a given sampling rate.

If the multiplex delay is small enough, a number J of geophone groups can be connected to the apparatus described hereinbefore. It should be noted that only one geophone group is shown presently by way of an example. After completion of a recording cycle for the first group, a recording cycle starts for the second group, and so on until the N geophones of the J group have been sampled, then the sampling cycle starts for the first group again. Obviously there must be N times J rejection counters available (one counter for every geophone of every group) to make such a multiple use of the present invention possible.

What is claimed is:

1. Seismic apparatus for providing an enhanced seismic signal comprising:

a plurality of seismic detector means for detecting vibrations of the earth surface and providing a corresponding plurality of seismic signals representative of the detected vibrations, multiplexing means for multiplexing the seismic signals from the seismic detector means to provide a multiplexed signal, memory means receiving the multiplexed signals for separating and storing portions of the multiplexed signal according to the detector means of origin so that each stored portion is in effect a sample of a seismic signal from a detector means, means for deriving from the stored samples a statistical reference for the seismic signals from the plurality of detector means, means for discarding outlying samples from the stored samples in accordance with the statistical reference, means for combining the remaining samples in a predetermined manner to provide an enhanced seismic signal, and means connected to the discarding means for determining whether or not a statistical significant deviation exists between the rejection rates of the seismic detector means.

2. Apparatus as described in claim 1 in which the combining means averages the remaining samples to provide an average signal as the enhanced seismic signal.

3. Apparatus as described in claim 2 further comprising:

means connected to the averaging means for determining the variance between the remaining samples.

4. Apparatus as described in claim 1 which the combining means determines the median of the remaining samples and provides a median signal as the enhanced seismic signal.

5. Apparatus as described in claim 4 further comprising:

means for determining the variance of the remaining samples used in the determination of the median.

6. A seismic method for providing an enhanced seismic signal comprising the steps of:

detecting vibrations of the earth surface, with a plurality of seismic detectors, providing a plurality of seismic signals representative of the detected vibrations, multiplexing the seismic signals from the seismic detectors to provide a multiplexed signal, separating and storing portions of the multiplexed signal according to the detector of origin so that each stored portion is in effect a sample of a seismic signal from a detector, deriving from the stored samples a statistical reference for the seismic signals from the plurality of detectors, discarding outlying samples from the stored samples in accordance with the statistical reference, combining the remaining samples in a predetermined manner to provide an enhanced seismic signal, and determining whether or not a statistical significant deviation exists between the rejection rates of the seismic detectors.

7. A method as described in claim 6 in which the combining step includes averaging the remaining samples to provide an average signal as the enhanced seismic signal.

8. A method as described in claim 7 further comprising the step of:

determining the variances between the remaining samples.

9. A method as described in claim 6 in which the combining step includes determining the median of the remaining samples, and providing a median signal as the enhanced seismic signal.

10. A method as described in claim 9 further comprising the step of:

determining the variance of the remaining samples used in the determination of the median.

11. Marine seismic apparatus for providing an enhanced seismic signal comprising:

a plurality of seismic detector means for detecting pressure variations in water and providing a corresponding plurality of seismic signals representative of the detected pressure variations, multiplexing means for multiplexing the seismic signals from the seismic detector means to provide a multiplexed signal, memory means receiving the multiplexed signals for separating and storing portions of the multiplexed signal according to the detector means of origin so that each stored portion is in effect a sample of a seismic signal from a detector means, means for deriving from the stored samples a statistical reference for the seismic signals from the plurality of detector means, means for discarding outlying samples from the stored samples in accordance with the statistical reference, means for combining the remaining samples in a predetermined manner to provide an enhanced seismic signal, and means connected to the discarding means for determining whether or not a statistical significant deviation exists between the rejection rates of the seismic detector means.

12. Apparatus as described in claim 11 in which the combining means averages the remaining samples to provide an average signal is the enhanced seismic signal.

13. Apparatus as described in claim 12 further comprising:

means connected to the averaging means for determining the variance between the remaining samples.

14. Apparatus as described in claim 11 in which the combining means determines the median of the remaining samples and provides a median signal as the enhanced seismic signal.

15. Apparatus as described in claim 14 further comprising:

means for determining the variance of the remaining samples used in the determination of the median.

16. A marine seismic method for providing an enhanced seismic signal comprising the steps of:

detecting pressure variations in water, with a plurality of hydrophones, providing a plurality of seismic signals representative of the detected pressure variations, multiplexing the seismic signals from the seismic detectors to provide a multiplexed signal, separating and storing portion of the multiplexed signal according to the detector of origin so that each stored portion is in effect a sample of a seismic signal from a detector, deriving from the stored samples a statistical reference for the seismic signals from the plurality of detectors, discarding outlying samples from the stored samples in accordance with the statistical reference combining the remaining samples in a predetermined manner to provide an enhanced seismic signal, and determining whether or not a statistical significant deviation exists between the rejection rates of the seismic detectors.

17. A method as described in claim 16 in which the combining step icludes averaging the remaining samples to provide an average signal as the enhanced seismic signal.

18. A method as described in claim 17 further comprising the step of:

determining the variances between the remaining samples.

19. A method as described in claim 16 in which the combining step includes determining the median of the remaining samples, and providing a median signal as the enhanced seismic signal.

20. A method as described in claim 19 further comprising the step of:

determining the variance of the remaining samples used in the determination of the median

* * * * *